United States Patent
Lim et al.

(10) Patent No.: US 9,083,547 B2
(45) Date of Patent: Jul. 14, 2015

(54) HOME APPLIANCE AND METHOD OF OPERATING THE SAME

(75) Inventors: Jeonghyun Lim, Changwon-Si (KR); Juyoung Min, Changwon-Si (KR); Namwoo Kwon, Changwon-Si (KR)

(73) Assignee: LG Electronics Inc., Seoul (KR)

( * ) Notice: Subject to any disclaimer, the term of this patent is extended or adjusted under 35 U.S.C. 154(b) by 844 days.

(21) Appl. No.: 13/090,662

(22) Filed: Apr. 20, 2011

(65) Prior Publication Data

US 2011/0264245 A1  Oct. 27, 2011

(30) Foreign Application Priority Data

Apr. 21, 2010  (KR) .......................... 10-2010-0037099

(51) Int. Cl.
*G06F 17/00* (2006.01)
*H04L 12/28* (2006.01)
*H04L 12/12* (2006.01)

(52) U.S. Cl.
CPC ............ *H04L 12/2827* (2013.01); *H04L 12/12* (2013.01); *H04L 2012/285* (2013.01); *Y02B 60/34* (2013.01)

(58) Field of Classification Search
None
See application file for complete search history.

(56) References Cited

U.S. PATENT DOCUMENTS

| | | | | |
|---|---|---|---|---|
| 6,665,384 | B2 * | 12/2003 | Daum et al. | 379/102.03 |
| 6,782,309 | B2 * | 8/2004 | Laflamme et al. | 700/275 |
| 6,788,529 | B2 * | 9/2004 | Homer et al. | 361/679.27 |
| 8,068,936 | B2 * | 11/2011 | Eichman | 700/275 |
| 2004/0125782 | A1 * | 7/2004 | Chang | 370/338 |
| 2004/0260853 | A1 * | 12/2004 | Cho | 710/300 |
| 2006/0116166 | A1 * | 6/2006 | Hibino | 455/557 |
| 2008/0062864 | A1 * | 3/2008 | Balasubramanian et al. | 370/228 |
| 2008/0238659 | A1 * | 10/2008 | Houde et al. | 340/539.13 |
| 2009/0184689 | A1 * | 7/2009 | Kressner et al. | 320/162 |

FOREIGN PATENT DOCUMENTS

| | | |
|---|---|---|
| JP | 2005-167312 | 6/2005 |
| KR | 10-2002-0059464 | 7/2002 |
| KR | 10-2008-0025698 | 3/2008 |
| KR | 10-2008-0044576 | 5/2008 |

OTHER PUBLICATIONS

Korean Office Action issued in KR Application No. 10-2010-0037099 dated Apr. 18, 2011.
Korean Notice of Allowance issued in KR Application No. 10-2010-0037099 dated Oct. 31, 2011.

* cited by examiner

*Primary Examiner* — Sean Shechtman
(74) *Attorney, Agent, or Firm* — KED & Associates

(57) ABSTRACT

A home appliance and a method of operating the same are provided. The home appliance has a communication device that can be easily detached, can selectively set a communication method according to a peripheral network environment, enables an easy connection to a smart server by changing a position of the communication device and can thus transmit and receive data by stably communicating with the smart server regardless of an obstacle and a position of the home appliance.

18 Claims, 11 Drawing Sheets

HOME APPLIANCE AND METHOD OF OPERATING THE SAME

CROSS-REFERENCE TO RELATED APPLICATION

This application claims the benefit of Korean Application No. 10-2010-0037099, filed on Apr. 21, 2010 in the Korean Intellectual Property Office, the disclosure of which is incorporated herein by reference.

BACKGROUND

1. Field

This relates to a home appliance and a method of operating the same, and more particularly, to a home appliance and a method of operating the same that can connect to a smart server including rate information.

2. Background

Nowadays, many devices are used for a more comfortable living. At home, user convenience is provided using an air conditioner for indoor air, a refrigerator for storing food, a television and radio for providing entertainment, and a computer, and in a factory, for manpower shortage, dangerous work processing, and quick work processing, most operations are performed by a machine.

Various appliances including the home appliances use electricity as an energy source, and a power plant for generating such energy has been built.

Nowadays, energy consumption gradually increases and existing fossil fuel has been exhausted, and thus an interest in new energy development increases and an interest in energy consumption also increases.

In a summer season in which energy consumption increases, a predetermined amount of energy is generated to meet with a demand of electrical energy, but as energy consumption gradually increases, a problem occurs in energy supply and demand. However, in a present situation that a power plant cannot increase without limit, a research for a method of reducing energy consumption has been performed.

Accordingly, a power amount consumed in a building is measured, a demand system is applied to prevent a maximum consumption amount from exceeding a predetermined value or by controlling an operation factor of operating appliances, power consumption is limited and managed, but these methods do not correspond to increase of energy consumption.

Thereby, instead of simply limiting and managing energy consumed at a home or a building, a method of generating energy according to a required power amount by organically connecting an energy consumption side and a energy generation side like a power plant through a communication network and of changing energy consumption according to a change of the generated energy and the consumed energy is suggested.

In such a system, as an energy generation side, an energy consumption side, and each appliance are connected to each other and transmit and receive data, energy can be generated according to energy consumption and balanced energy consumption can be performed.

SUMMARY

Embodiments as broadly described herein may solve the above problems, and a home appliance as embodied and broadly described herein may include a communication unit that can be easily detached and for transmitting and receiving data by easily connecting to a smart server and a method of operating the same.

According to an embodiment as broadly described herein, there is provided a home appliance including: a detachable communication unit including at least one communication module; a connection unit for mounting the communication unit; and a controller for detecting that the communication unit is mounted in the connection unit and for transmitting and receiving data by connecting to the smart server through the communication unit and for controlling at least one of operation setting and an operation load according to data received from the smart server and for transmitting an operation state to the smart server through the communication unit.

According to another embodiment as broadly described herein, there is provided a method of operating a home appliance, the method including: testing, when a communication unit is normally mounted by detecting a mounting state of the communication unit, that at least one communication module included in the communication unit is connected to a smart server; setting a communication module connected to the smart server as basic communication; connecting to the smart server using a communication module that is set as basic communication and receiving data from the smart server; and controlling at least one of operation setting and an operation load according to the received data and operating the home appliance.

BRIEF DESCRIPTION OF THE DRAWINGS

Embodiments disclosed herein will become more fully understood from the detailed description given herein below and the accompanying drawings, which are given by illustration only, and thus are not limiting, and wherein.

DESCRIPTION OF THE PREFERRED EMBODIMENT

Hereinafter, exemplary embodiments will be described in detail with reference to the accompanying drawings.

Figure 1:
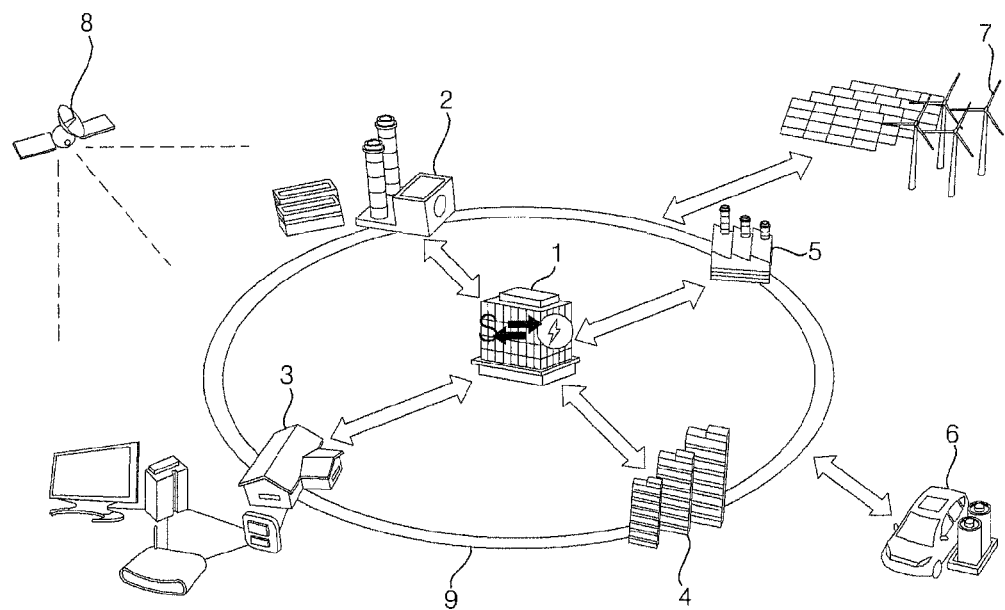
FIG. 1 is a diagram illustrating a configuration of a smart grid system according to an exemplary embodiment as broadly described herein.

FIG. 1 is a diagram illustrating a configuration of a smart grid system according to an exemplary embodiment as broadly described herein.

As shown in FIG. 1, the smart grid system includes power generation systems 5 and 7 for generating energy, an energy consumption side, for example, a factory 2, a home 3, a company, a building 4, a vehicle charging station 6, a network 9 for connecting such an energy generation side and energy consumption side, and a power management server 1 for organically connecting the energy generation side and the energy consumption side using the network.

The power generation system, which is an energy generation side is not limited to a thermal power plant 5, a wind force, sun light, or solar heat power plant 7, a nuclear power plant, and a hydropower plant and includes all power generation systems for generating energy.

The energy consumption side includes a plurality of home appliances provided within a home, a mechanical equipment, an air conditioning appliance, and a ventilation device of a factory, an elevator, an escalator, a lighting device, a ventilation device, and an air conditioning appliance of a building, and a vehicle charging station. Other appliances using electrical energy are included in an energy consumption side.

The network includes a wired network of a local area network (LAN), a power line network, and a phone network, a wireless network such as a wireless LAN, Wibro, a mobile communication network, and high-speed downlink packet access (HSDPA), and a communication network using a satellite 8. In this case, it is unnecessary to unify a network for connecting each element as one network, and elements can be connected through a link between previously installed different communication networks. The network may further include a device for connecting different communication.

The smart grid system connects an energy generation side and an energy consumption side separated from each other through a communication network, and thus a power generation system for generating energy estimates and changes an energy generation amount according to an energy consumption pattern, and an energy consumption side grasps a generated energy amount and an entire energy consumption pattern, and changes operation.

In this case, the power management server generates rate information having a value changing according to energy generation of a power generation system, an energy consumption situation of each energy consumption side, and a power use amount, and transmits the generated rate information to each energy consumption side.

Each energy consumption side includes each smart server, receives rate information from the power management server 1, and transmits the received rate information to each appliance. Accordingly, each appliance variably controls operation according to rate information. The smart server collects power consumption information of a plurality of appliances and transmits the power consumption information to the power management server 1.

Figure 2:
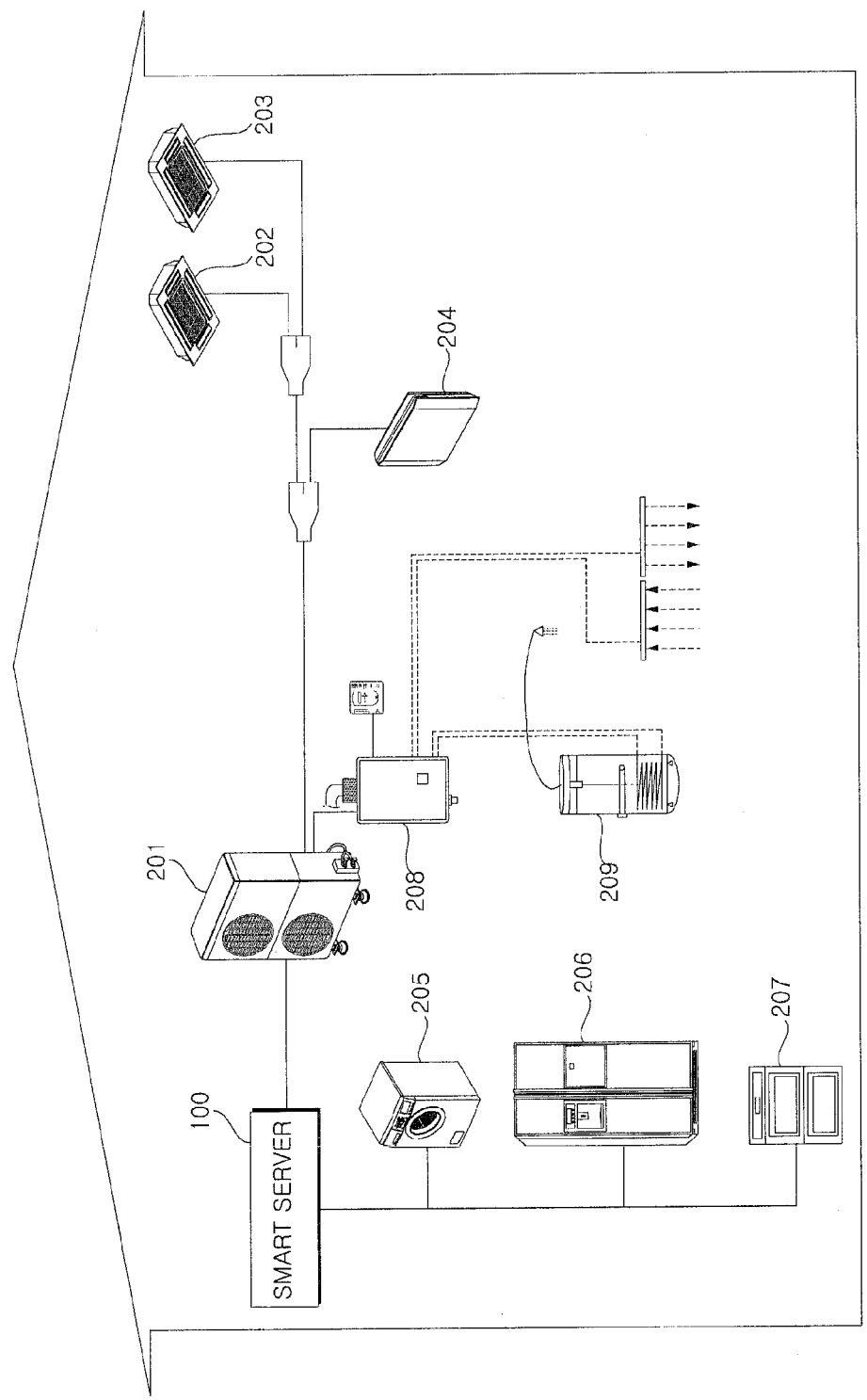
FIG. 2 is a diagram illustrating a configuration of home appliances and a smart server in the smart grid system of FIG. 1.

FIG. 2 is a diagram illustrating a configuration of home appliances and a smart server in the smart grid system of FIG. 1.

As shown in FIG. 2, the home 3 of the energy consumption side includes a plurality of home appliances 201 to 209, and a smart server 100.

The home appliance includes a washing machine 205, a refrigerator 206, a Kimchi refrigerator 207, an outdoor unit 201, indoor units 202 to 204, a ventilation device, and heaters 208 and 209. Further, the home appliance may further include appliances that consuming energy such as an electric oven, an electric rice cooker, an iron, and a lighting device.

In this case, a plurality of home appliances are connected to a predetermined network to be each connected to the smart server 100. The plurality of home appliances are integrated and connected through a network and may be separated into different networks, but are connected to the smart server 100 according to each communication method.

The smart server 100 may be provided on a building basis or on a furniture basis, and in a large-scale building or factory, a plurality of smart servers may be provided. When a plurality of smart servers are provided, each smart server is connected to a network, and one smart server may be set as a master.

The smart server 100 is connected to the power management server 1 of a smart grid system to transmit and receive information about a consumption power amount and receives rate information from the power management server 1 and transmits the rate information to a plurality of connected home appliances. The smart server 100 periodically communicates with the power management server 1 and immediately transmits the changed rate information to the home appliance.

The smart server 100 separately accumulates and stores an operation time period of each home appliance according to a segment value of each rate information based on the received rate information and calculates power consumption information and estimated electric rates. Further, the smart server 100 transmits information about power consumption of a plurality of home appliances to the power management server 1.

The smart server 100 receives data about an operation time period and an operation record according to rate information from a plurality of home appliances, and calculates a power amount consumed by a plurality of home appliances based on a preset rate schedule and rate calculation data that receive from the power management server 1 and electric rates according to the power amount. The smart server 100 individually calculates estimated electric rates of each of a plurality of home appliances and transmits the estimated electric rates to each home appliance.

Figure 3:
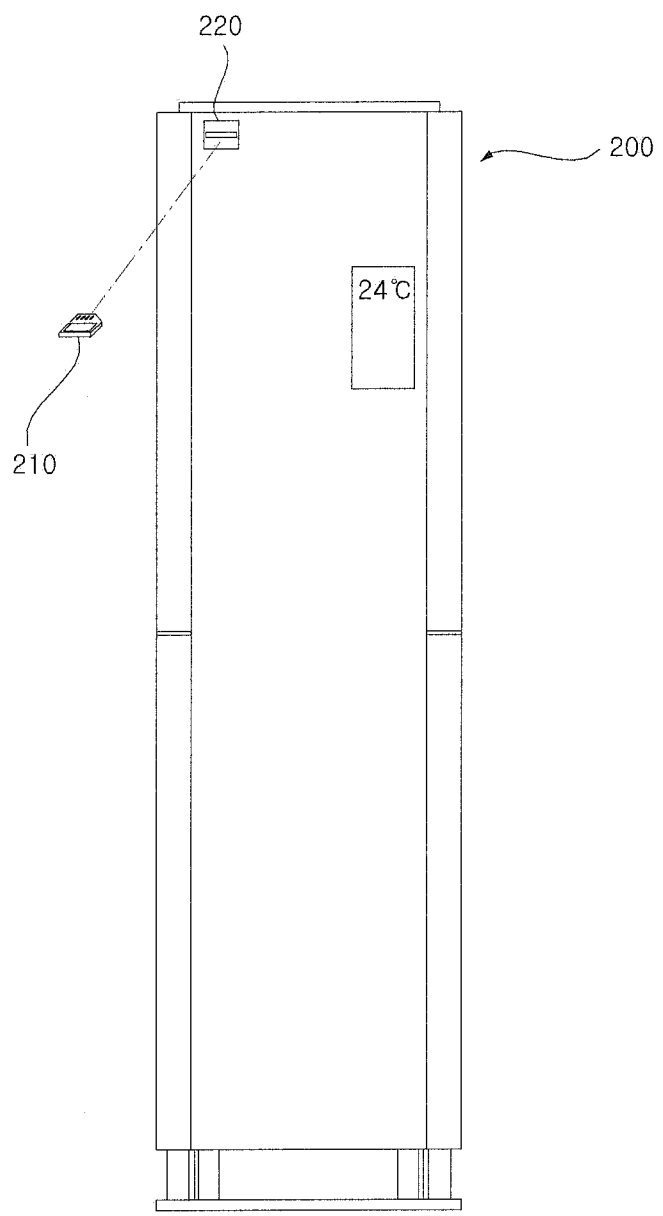
FIG. 3 is a front view of a home appliance having a detachable communication unit in the smart grid system of FIG. 1.

FIG. 3 is a front view of a home appliance having a detachable communication unit in the smart grid system of FIG. 1.

A home appliance according an exemplary embodiment may be, for example, an air conditioner including an outdoor unit and an indoor unit, or another type of home appliance that operates by consuming energy regardless of a kind thereof, and a description of a separate configuration according to a kind of home appliances will be omitted.

Further, an air conditioner according an exemplary embodiment may be applied to even any case of a stand type air conditioner, a wall-mounted air conditioner, and a roof type air conditioner, however for convenience of description, a stand type air conditioner is exemplified.

The air conditioner includes indoor units 202 to 204 for discharging cold air to an indoor space and an outdoor unit 201 for supplying refrigerant to the indoor unit, and the indoor unit and the outdoor unit are connected through a refrigerant pipe. Further, the air conditioner includes a local controller connected to the indoor units and for inputting an operation instruction to the indoor units or a remote controller connected to a plurality of units and for controlling and monitoring the operation. The air conditioner may be operated by engaging with a ventilation unit.

The outdoor unit 201 includes a compressor and an outdoor heat exchanger and supplies refrigerant to the input unit according to an operation state of an air conditioner by compressing refrigerant or exchanging a heat with refrigerant, and a description of a configuration thereof will be omitted.

As shown in FIG. 3, an indoor unit 200 includes a communication unit 210 for transmitting and receiving data to and from the smart server 100 and a connection unit 220 for mounting the communication unit 210.

The communication unit 210 is mounted in the connection unit 220 to be connected to the indoor unit and performs communication between the indoor unit and the smart server according to the control of the indoor unit. The communication unit 210 includes a plurality of communication modules and selects and communicates one of a plurality of communication modules according to a peripheral communication environment.

Further, the communication unit 210 can be detached from the connection unit 220. The detached communication unit 210 is connected to a connection unit of another home appliance to transmit and receive data.

The communication unit 210 exemplifies a card type communication device that can be easily detached, but a form thereof is not limited thereto and can be installed within the home appliance, and when the connection unit 220 is not provided in the home appliance, the communication unit 210 can be connected to the home appliance from the outside through a separate connection device.

The connection unit 220 has different forms according to a form of the communication unit 210, and a plurality of connection terminals are provided on a form basis in order to mount the communication unit 210 of various forms.

Further, the indoor unit 200 includes an input unit, an output unit, a discharge port for discharging air to indoor, an inhalant port for inhaling indoor air to the inside, a heat exchanger for exchanging a heat of inhaled air, an indoor unit fan for exchanging a heat of the inhaled air and discharging the inhaled air through the discharge port, and a louver or a vane for adjusting opening or closing or a discharge angle of the discharge port, but a description of other configurations of the indoor unit will be omitted.

Figure 4:
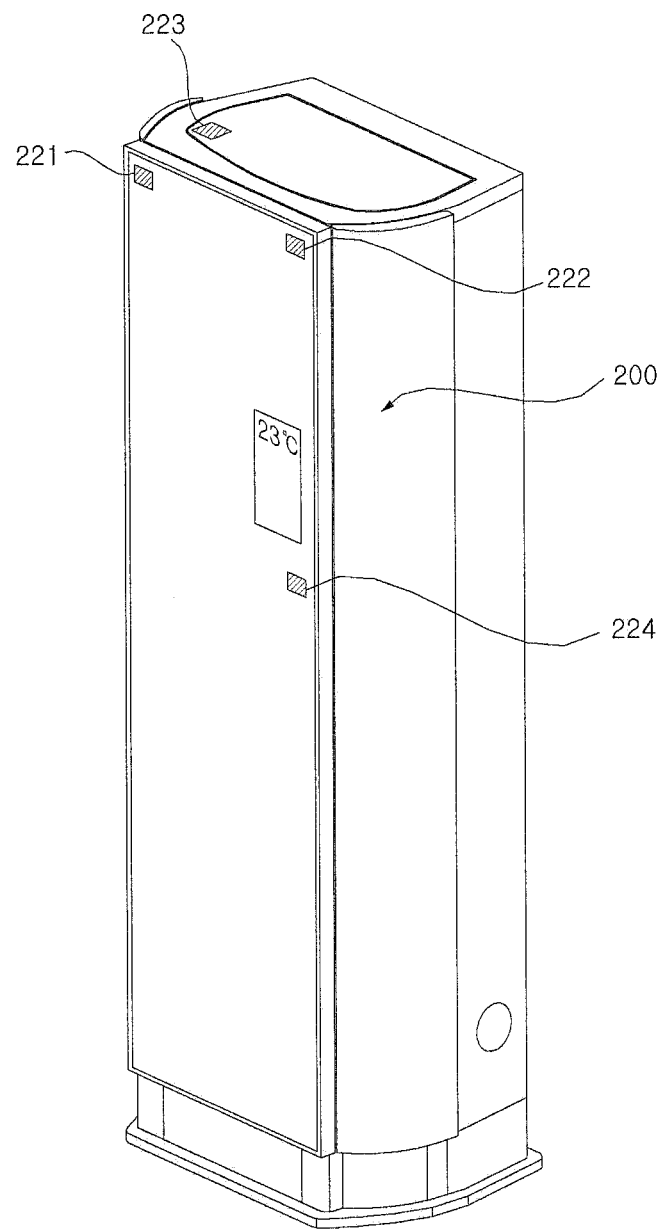
FIG. 4 is a perspective view illustrating a position of a communication unit in a home appliance of the smart grid system of FIG. 1.

FIG. 4 is a perspective view illustrating a position of a communication unit in a home appliance of the smart grid system of FIG. 1.

In the home appliance 200, the connection unit 220 having the detachable communication unit 210 may be disposed at various locations, as shown in FIG. 4.

The connection unit 220 for mounting the communication unit 210 may be installed in one surface of an upper part of the home appliance. According to a position of the connection unit 220, a position of communication unit is determined.

The connection unit 220 is disposed at a front surface of an upper part of the home appliance.

In this case, the connection unit 220 is disposed at a front surface 221 of an upper part of the home appliance, or is disposed at upper end surface 223 of an upper part.

Further, the connection unit 220 is disposed at a left front surface 221 or a right front surface 222 of an upper part.

Further, the connection unit 220 may be disposed at a front panel. Particularly, the connection unit 220 may be disposed adjacent to an input unit or an output unit provided in a front portion 224 of the home appliance. In this case, because the input unit and the output unit are disposed at a position at which a user's hand can easily contact, the input unit and the output unit can be easily detached.

Figure 5:
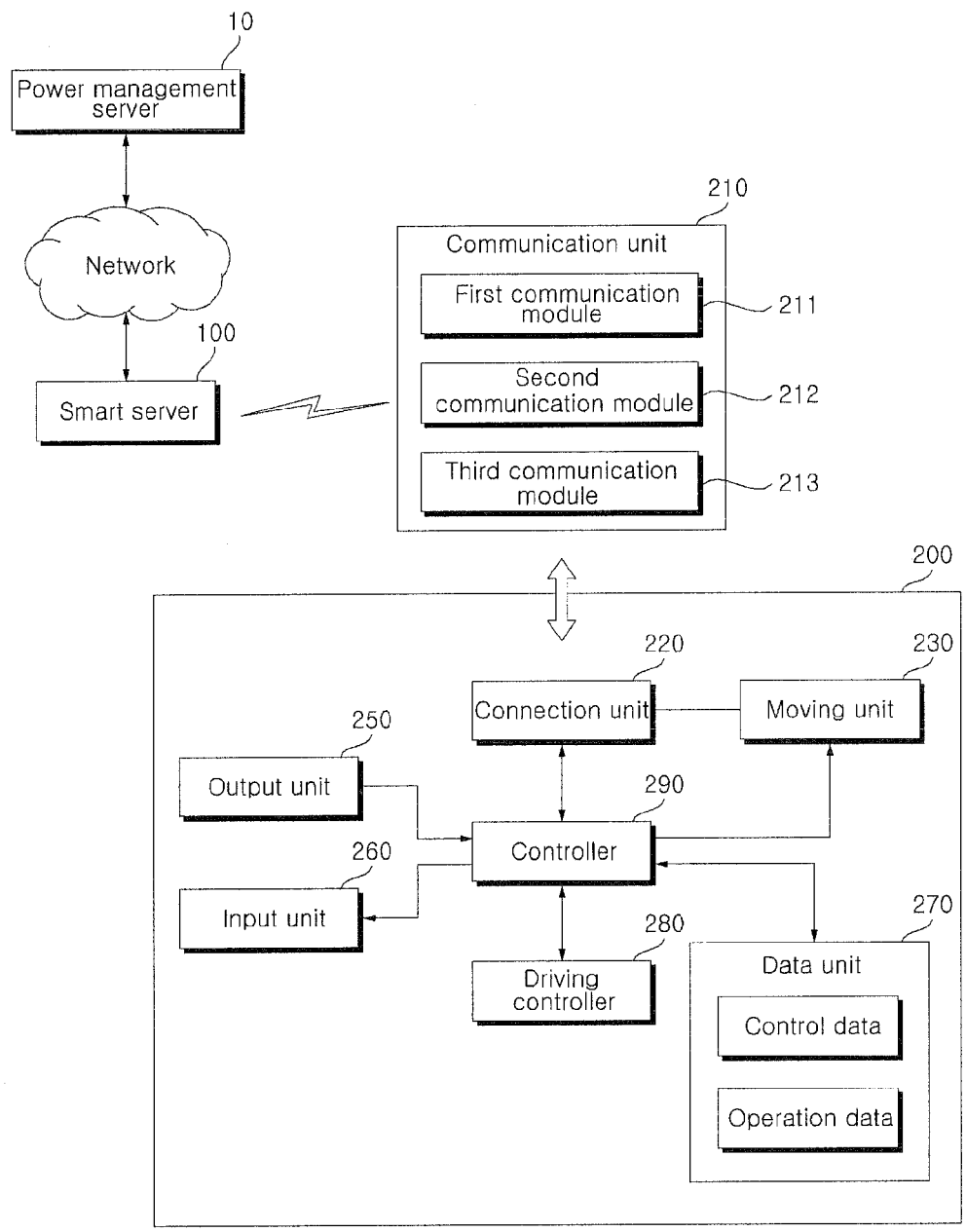
FIG. 5 is a block diagram illustrating a configuration of a home appliance in the smart grid system of FIG. 1.

FIG. 5 is a block diagram illustrating a configuration of a home appliance in the smart grid system of FIG. 1.

As shown in FIG. 5, the home appliance 200 includes a communication unit 210, an input unit 250, an output unit 260, a driving controller 280, a data unit 270, and a controller 290 for controlling entire operations of the home appliance.

Further, the home appliance 200 includes the communication unit 210, the connection unit 220, and the moving unit 230.

In this case, each home appliance 200 basically includes the above-described configuration and may further include a separate configuration according to a characteristic of the home appliance.

The communication unit 210 includes at least one communication module, transmits and receives data to and from other units such as an outdoor unit or an indoor unit, receives rate information from the smart server 100 by communicating with the smart server 100, and transmits operation information about operation of an air conditioner to the smart server 100. The communication unit 210 transmits and receives data by connecting to the smart server 100 periodically or when a predetermined event occurs.

The communication unit 210 includes first to third communication modules 211 to 213, selects a communication module appropriate for a peripheral network environment by performing a connection test of each communication module, and is connected to the smart server 100 using the selected communication module.

In this case, the communication unit 210 can use different communication methods for communication between an outdoor unit and an indoor unit and communication with the smart server 100 and selectively uses a communication module according to a communication method with a target to communicate. The communication unit 210 may include a converter for transmitting data of different communication methods.

In this case, the communication unit 210 includes at least one wireless communication module of an WiFi communication module, a ZigBee communication module, an Wibro communication module, and a mobile phone communication module. Further, the communication unit 210 includes at least one wired transmission module of a power line communication module and a local area communication module.

The communication unit 210 is mounted in the connection unit 220, as described above and is a card type communication device that can be detached from the connection unit 220.

When the communication unit 210 is mounted in the connection unit 220, a connection terminal provided in the communication unit 210 is electrically connected to a connection terminal of the connection unit 220 to operate through power supplied from the home appliance 200.

After being detached from the connection unit 220, the communication unit 210 is mounted and used in other home appliances. However, the communication unit 210 may store information about the connected home appliance and operate after a separate certification procedure. In this case, the home appliance also performs certification of the mounted communication unit 210.

The communication unit 210 is mounted in the connection unit 220, as described above, and the connection unit 220 detects whether mounting of the communication unit 210 and applies a mounting state to the controller 290. The connection unit 220 changes a shape thereof and a position of a connection terminal according to a form of the mounted communication unit 210.

A power terminal for supplying power to the communication unit 210 is included in the connection terminal provided in the connection unit 220, and when the communication unit 210 is mounted in the connection unit 220, the connection unit 220 supplies power to the communication unit 210.

The connection unit 220 detects whether the communication unit 210 is mounted by detecting a change of an internal current or a voltage value through a detection circuit connected to one of connection terminals and applies a detection signal to the controller 290.

As shown in FIGS. 3 and 4, the connection unit 220 is positioned at one surface of an upper end portion or a front surface portion of a home appliance to enable an easy connection to the smart server 100 through the communication unit 210.

Further, the connection unit 220 is provided in the moving unit 230.

When the home appliance 200 operates, or when the home appliance operates in a predetermined operation mode, the moving unit 230 enables a portion of the home appliance 200 to move from a main body.

When the connection unit 220 is provided in the moving unit 230, the moving unit 230 moves from the main body according to operation of the home appliance 200, and thus a position of the connection unit 220 provided in the moving unit 230 is changed. That is, according to a motion of the moving unit 230, a position of the communication unit 210 mounted in the connection unit 220 is changed. As a position of the moving unit 230 changes, signal reception intensity or a communication state of the communication unit 210 can be varied.

In this case, the moving unit 230 moves upward from the main body of the home appliance 200 and thus the connection unit 220 is positioned higher than the main body of the home appliance 200.

Further, the moving unit 230 protrudes in one direction of a left side, a right side, and a front surface from a main body of the home appliance 200.

Further, in the moving unit 230, a portion of the main body of the home appliance laterally moves. As described above, because a position change of the moving unit 230 has an influence on a communication state of the communication unit 210, the controller 290 changes a position of the moving unit 230 to a right side, a left side, an upper side, and a lower side, thereby changing a communication state of the communication unit 210.

The controller 290 changes a position of the moving unit 230 to control the moving unit 230 to position at a position in which intensity of a signal received through the communication unit 210 is largest. The controller 290 controls operation of the home appliance by periodically communicating with the smart server 100 and thus transmitting and receiving data about rate information or power consumption, and thus controls the communication unit 210 and the smart server 100 to stably transmit and receive data by changing a position of the moving unit 230, as described above.

The controller 290 determines whether the communication unit 210 is mounted using a detection signal of the connection unit 220.

When a plurality of communication modules are included in the communication unit 210, the controller 290 tests that a plurality of communication modules are each connected to the smart server 100 and sets one of communication modules in which a connection to a smart server is succeeded as basic communication (or default communication) and transmits and receives data to and from the smart server.

Particularly, when information about a peripheral network environment does not exist at a position at which the home appliance is installed, if information about a communication method using in the smart server 100 does not exist, the controller 290 determines a peripheral network environment through a connection test of each communication module, as described above.

In this case, when abnormality occurs in basic communication (or default communication), the controller 290 resets basic communication (or default communication) by testing other communication modules and connects to the smart server 100 using other communication modules.

When a mounting state of the communication unit 210 is detected, the controller 290 controls the output unit 260 to output state information about normal attachment or detachment in at least one form of predetermined effect sound, a guide sentence, and guide light. The controller 290 divides when the communication unit 210 is attached and detached and outputs state information.

When a connection state of the communication unit 210 is normal, but a response is not received for a predetermined time period or more from the smart server 100, the controller 290 controls the output unit 260 to output a warning about a communication failure state.

The input unit 250 includes an input means of at least one switch, button, touch pad, and dial and is used for inputting data of an operation mode of power supply for operating an air conditioner and an operation of an air conditioner, operation setting according to the operation mode, and a schedule.

The output unit 260 has at least output means of a display light such as a lamp and a light emitting diode (LED), a display unit, and a speaker and outputs an operating state of the home appliance. In this case, the output unit 260 displays an operating state, a present operation state, input setting, and a normal operation of the home appliance with characters, numerals, and special characters and outputs effect sound, warning sound, an operation light, or an warning light.

Further, the output unit 260 displays rate information received through the communication unit 210 according to a control instruction of the controller 290 and displays operation information of an air conditioner corresponding to specific rate information and rate information thereof. In this case, rate information is calculated by the controller 290, or calculated by the smart server 100 and is received through the communication unit 210.

In this case, the input unit 250 and the output unit 260 are provided in a front panel, a lower surface, a lower part, an upper part of a front surface portion of the indoor units 202 to 204 and a position thereof is not limited to a position of this description.

In the data unit 270, setting data about operation of the home appliance and control data for operation control are stored, and data received from other units of an outdoor unit or other indoor units are stored, and an operation record is stored as operation data.

The driving controller 280 performs a predetermined operation according to setting of the input unit 250 by a control instruction of the controller 290. For example, in the indoor unit, the driving controller 280 performs entire operations such as driving of an indoor unit fan, opening and closing of a valve, and angle adjustment of a louver or a vane. In the outdoor unit, the driving controller 280 performs entire operations such as driving of a compressor, driving of the outdoor unit fan, and opening and closing of a valve.

The driving controller 280 supplies refrigerant from the outdoor unit to the indoor unit through such an operation, and discharges cold air in which a heat is exchanged in the indoor unit.

The controller 290 generates a control instruction to operate an air conditioner according to data that are input through the input unit 250, and controls transmission and reception of data and data input/output of the data unit 270 through the communication unit 210. Further, the controller 290 applies a control instruction to the driving controller 280 according to setting and thus controls the air conditioner to operate according to setting.

The controller 290 enables easy data transmission and reception of the communication unit 210 through a position change of the moving unit 230, and the controller 290 changes the input operation setting according to rate information received from the smart server 100 through the communication unit 210 and thus variably controls operation of the air conditioner.

Figure 6:
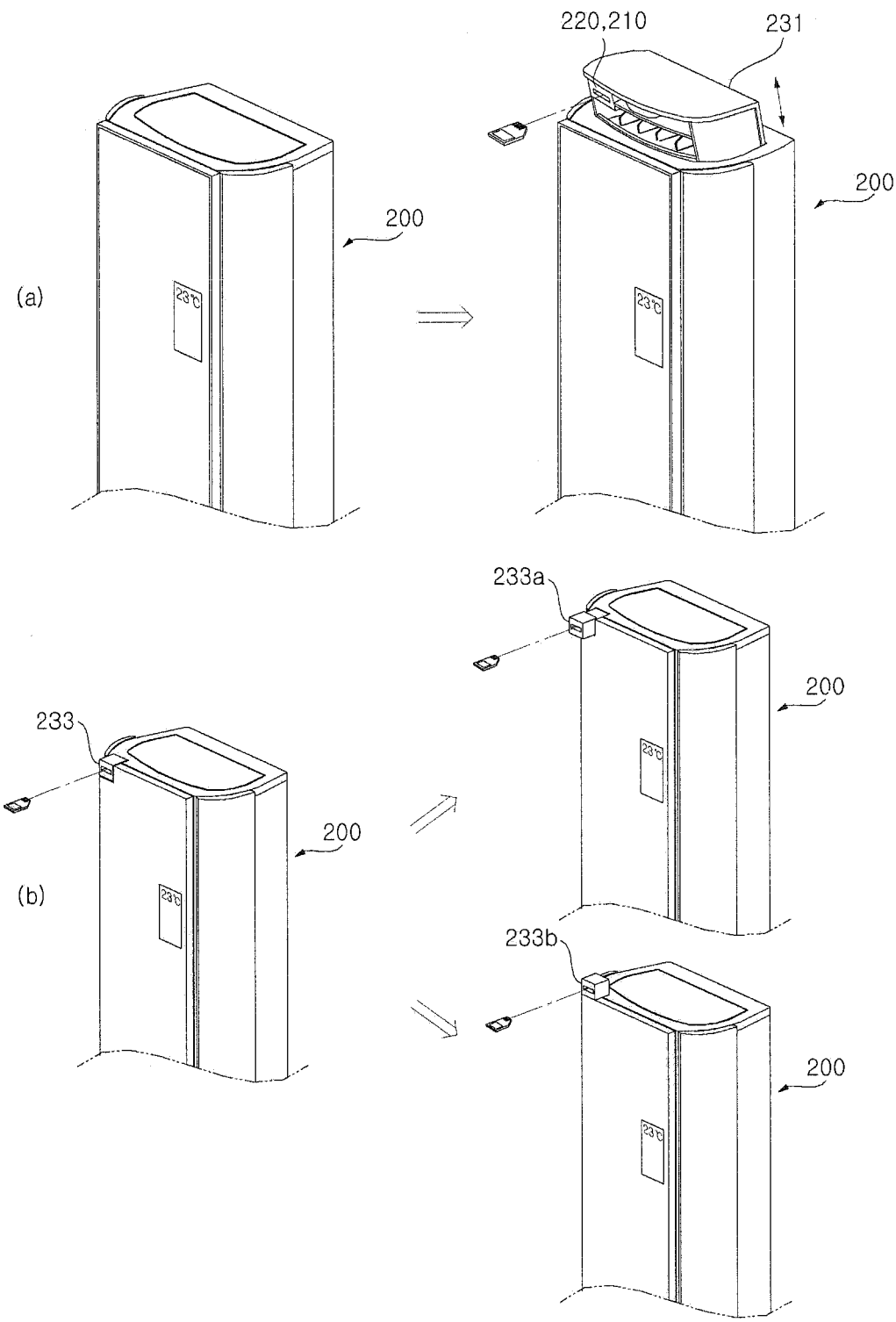
FIGS. 6, 7, and 8 are perspective views illustrating an example of position movement of a communication unit in a home appliance of the smart grid system of FIG. 1.
Figure 7:
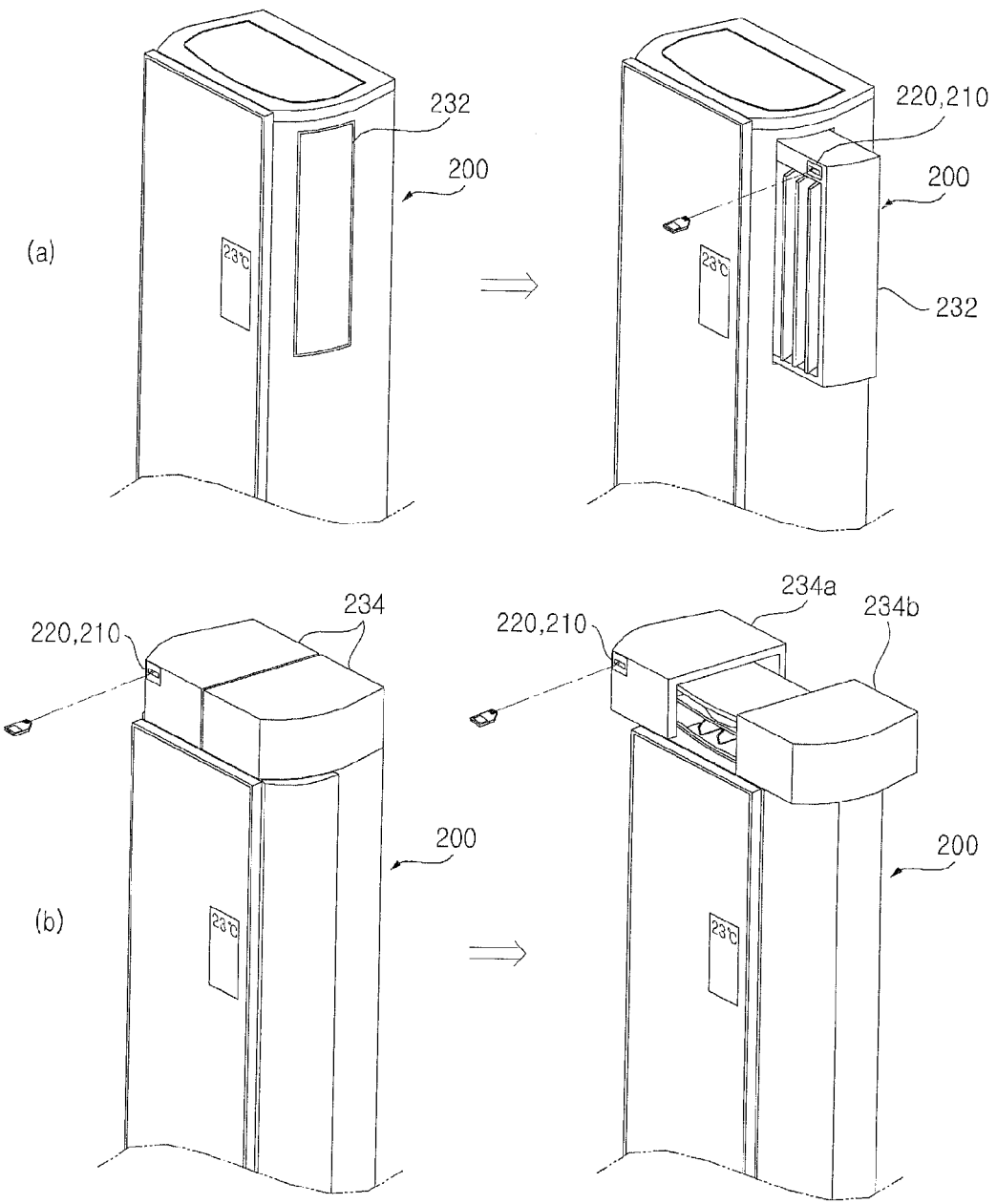
Figure 8:
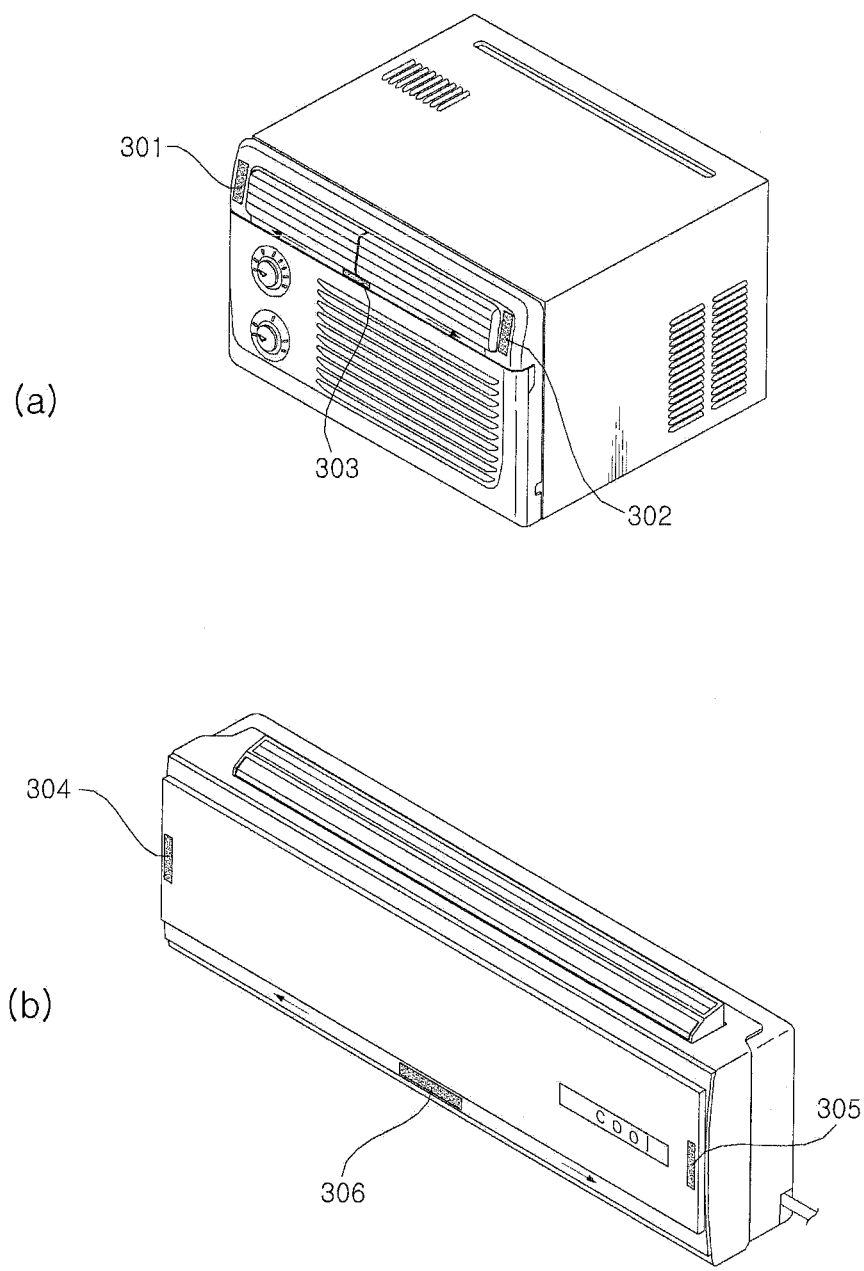

FIGS. 6, 7, and 8 are perspective views illustrating an example of position movement of a communication unit in a home appliance of the smart grid system of FIG. 1.

By moving a position of the moving unit 230 to a right side, a left side, an upper side, and a lower side, the controller 290 controls the connection unit 220 and the communication unit 210 to a change position thereof while the connection unit 220 provided in the moving unit 230 and the communication unit 210 mounted in the connection unit 220 are separated by a predetermined distance from a main body of the home appliance.

As shown in FIG. 6(a), an upper part of the home appliance 200 moves upward or downward from the main body. In this case, an upper discharge port is formed in a moving unit 231 that moves upward.

The connection unit 220 is provided in an upper end portion of the upward moved moving unit 231, and the communication unit 210 is mounted in the connection unit 220. Because the communication unit 210 is positioned at a high position of the home appliance, the communication unit 210 can communicate with the smart server 100 without being interfered by other home appliances.

As shown in FIG. 6(b), a portion of an upper part of the home appliance is protruded to the front surface or moves upward. In this case, in a moving unit 233, an entire upper end portion does not moves, as shown in FIG. 6(a), and only a moving unit 233a having the connection unit 220 and the communication unit 210 moves upward and downward, and only a moving unit 233b moves to the front side and the rear side.

By changing only a position of the moving unit 233, the controller 290 controls the communication unit 210 to transmit and receive data in a better communication environment while preventing other portions of the home appliance from being influenced regardless of opening and closing of a discharge port.

As shown in FIG. 7(a), a side surface of the home appliance is protruded to the left side or the right side. A discharge port is formed in a moving unit 232 protruded to the left side or the right side.

Further, the connection unit 220 and the communication unit 210 are provided in the moving unit 232, and the communication unit 210 moves from a main body to the left side or the right side.

In FIG. 7(b), an upper end moving unit of the home appliance is separated and moves to the left side and the right side. As the moving unit moves to the left side and the right side, a discharge port of the upper end is opened or closed.

The connection unit 220 and the communication unit 210 are provided in moving units 234a and 234b instead of the discharge port and move to the left side and the right side according to movement of a moving unit 234.

FIG. 8 illustrates an example of a wall-mounted air conditioner and an integral air conditioner.

As shown in FIGS. 8(a) and 8(b), in the home appliance 200, the connection unit 220 and the communication unit 210 are provided at left sides 301 and 304 or right sides 302 and 305, respectively, of the home appliance. It is preferable that the connection unit 220 in which the communication unit 210 is mounted is provided at an upper end of a front surface of the home appliance, but may be provided at an upper end of a side surface.

Further, the connection unit 220 and the communication unit 210 may be provided at front surfaces 303 and 306 of the home appliance.

Further, the connection unit 220 provided at the left sides 301, 301, and 304 or the right sides 302 and 305 of the home appliance can vertically move. Further, the connection unit 220 positioned at the front surfaces 303 and 306 of the home appliance can move to the left side or the right side. In this case, the connection unit 220 is provided in the moving unit 230, and as the moving unit 230 vertically or laterally moves, a position of the connection unit 220 is changed.

By disposing the connection unit 220 having the detachable communication unit 210 at an upper end portion of the home appliance and changing a position of the connection unit 220, as described above, the controller 290 controls the mounted communication unit 210 to stably transmit and receive data to and from the smart server 100.

Figure 9:
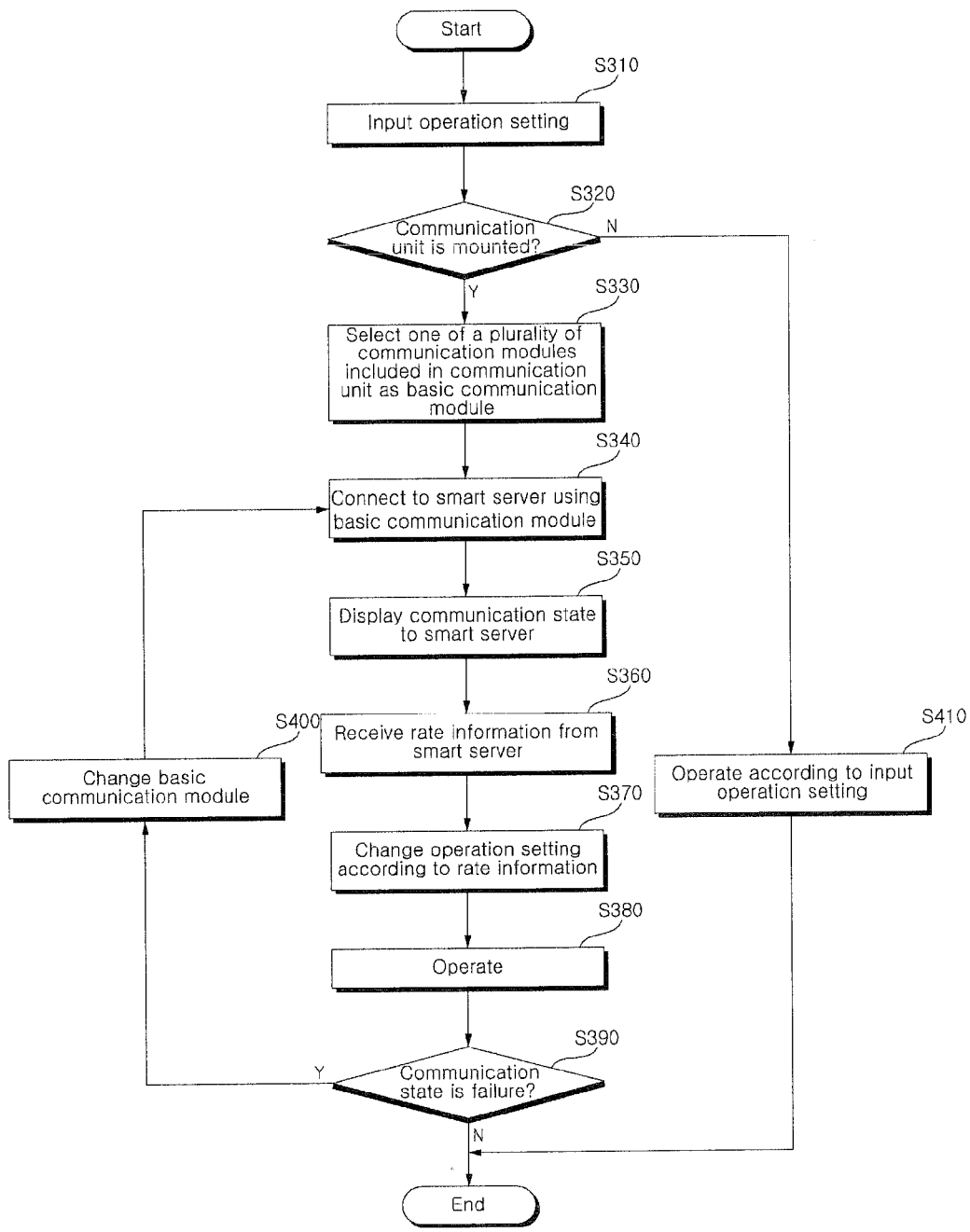
FIG. 9 is a flowchart illustrating a method of connecting to a smart server using a communication unit and operating the smart server in the home appliance of FIG. 5.

FIG. 9 is a flowchart illustrating a method of connecting to a smart server using a communication unit and operating a smart server in the home appliance described above.

Referring to FIG. 9, an operation setting is input through the input unit 250 (S310), and before starting operation according to operation setting, the controller 290 determines whether the communication unit 210 is mounted in the connection unit 220 (S320).

If the communication unit 210 is mounted in the connection unit 220, the communication unit 210 detects whether the communication unit 210 is mounted such that a current or a voltage of the inside is varied when the connection unit 220 is electrically connected to the communication unit 210, and the communication unit 210 applies a detection signal to the controller 290. In this case, the controller 290 determines whether the communication unit 210 is mounted using a detection signal applied from the connection unit 220.

If the communication unit 210 is not mounted in the connection unit 220, the controller 290 operates the home appliance according to the input operation setting (S410).

If the communication unit 210 is mounted in the connection unit 220, the controller 290 selects one of a plurality of communication modules included in the communication unit 210 as a basic communication module (S330), and the controller 290 connects to the smart server 100 using the basic communication module (S340).

The controller 290 controls the output unit 260 to display a communication state with the smart server 100 through the communication unit 210 (S350). The controller 290 receives rate information from the smart server 100 through the communication unit 210 (S360), and changes operation setting according to the received rate information (S370). For example, the controller 290 changes a target temperature according to an operation mode and a rate segment of rate information.

The controller 290 starts operation according to the changed operation setting (S380).

The controller 290 determines whether a communication state of the communication unit 210 is a failure (S390). If a communication state of the communication unit 210 is a failure, the controller 290 changes a basic communication module by performing again a connection test of a plurality of communication modules (S400), and the process returns to step S340 and thus the controller 290 receives rate information from the smart server using the changed basic communication module and operates the home appliance (S340 to S380).

Here, a connection test of a plurality of communication modules and a selection of a basic communication module are performed as follows.

Figure 10:
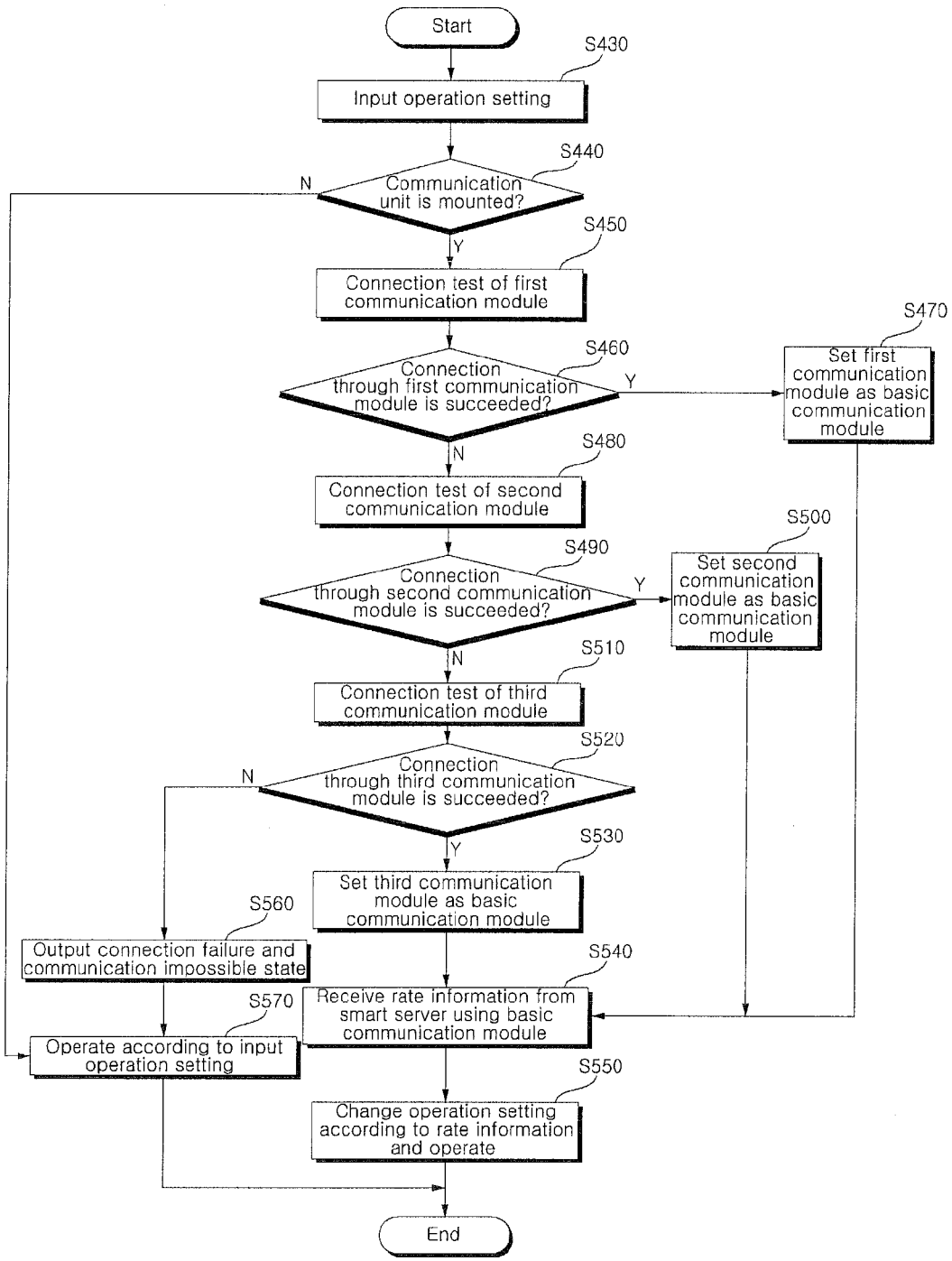
FIG. 10 is a flowchart illustrating a method of connecting to a smart server using a plurality of communication modules in the method of FIG. 9.

FIG. 10 is a flowchart illustrating a method of connecting to a smart server using a plurality of communication modules in the method of FIG. 9.

As shown in FIG. 10, an operation setting is input through the input unit 250 (S430), and the controller 290 determines whether the communication unit 210 is mounted using a detection signal of the connection unit 220 (S440). If the communication unit 210 is not mounted, the controller 290 operates the home appliance according to the input operation setting (S570).

If the communication unit 210 is mounted, the controller 290 tests a connection to the smart server 100 through a first communication module 211 of a plurality of communication modules 211 to 213 included in the communication unit 210 (S450).

The controller 290 determines whether a connection to the smart server 100 through the first communication module 211 is succeeded (S460), and if a connection to the smart server 100 through the first communication module 211 is succeeded, the controller 290 sets the first communication module as a basic communication module 211 (S470). If a connection to the smart server 100 through the first communication module 211 is failed, the controller 290 tests a second communication module 212 (S480).

The controller 290 determines whether a connection to the smart server 100 through the second communication module 212 is succeeded (S490), and if a connection to the smart server 100 through the second communication module 212 is succeeded, the controller 290 sets the second communication module 212 as a basic communication module (S500). If a connection to the smart server 100 through the second communication module 212 is failed, the controller 290 tests a third communication module 213 (S510).

The controller 290 determines whether a connection to the smart server 100 through the third communication module 213 is succeeded (S520), and if a connection to the smart server 100 using the third communication module 213 is succeeded, the controller 290 sets the third communication module 213 as a basic communication module (S530).

If a connection to the smart server 100 through the third communication module 213 is failed, the controller 290 controls the output unit 260 to output a connection failure and communication impossible state (S560). The controller 290 operates the home appliance according to the input operation setting (S570).

Further, when a plurality of communication modules among communication modules included in the communication unit 210 succeed in a connection to the smart server 100, the controller 290 compares signal sensitivity (signal intensity) of communication modules that succeed in a connection test and sets a communication module having the highest signal sensitivity as a basic communication module.

The controller 290 connects to the smart server 100 using the set basic communication module and receives rate information from the smart server 100 (S540). The controller 290 changes operation setting according to rate information and operates the home appliance (S550).

Even in a case where information about a communication method using in the smart server 100 does not exist through such a connection test, the controller 290 can select a communication module according to a peripheral network environment and thus receives rate information from the smart server 100.

When signal sensitivity is low or when a connection is failed in a connection test through a communication module, as described above, by changing a position of the communication unit 210, a connection test can be performed again.

Figure 11:
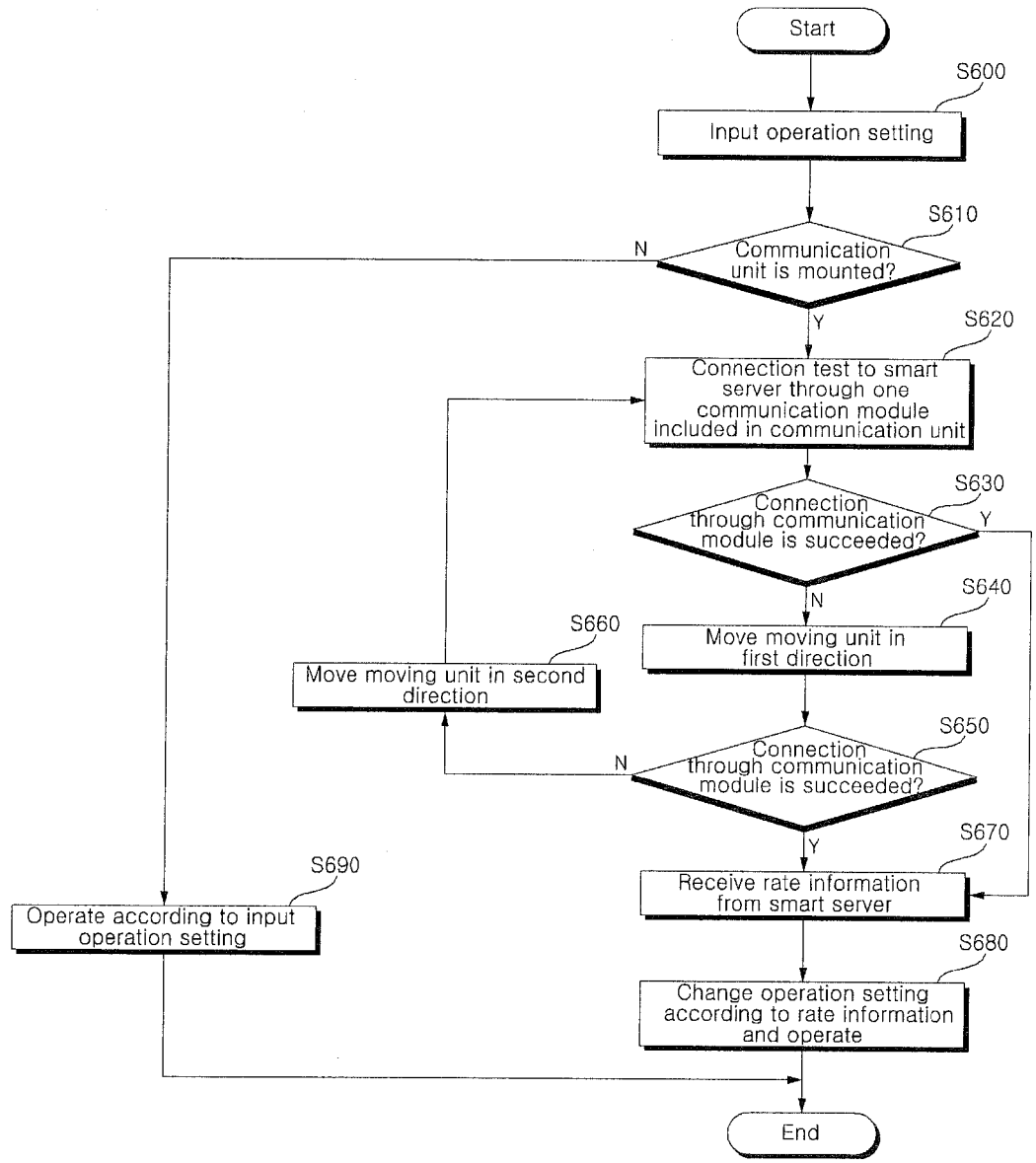
FIG. 11 is a flowchart illustrating a method of connecting to a smart server by changing a position of a communication unit in the method of FIG. 9.

FIG. 11 is a flowchart illustrating a method of connecting to a smart server by changing a position of a communication unit in the method of FIG. 9.

Referring to FIG. 11, when an operation setting is input to a home appliance through the input unit 250 (S600), the controller 290 determines whether the communication unit 210 is mounted (S610), and if the communication unit 210 is not mounted, the controller 290 operates the home appliance according to the input operation setting (S690). If the communication unit 210 is mounted, the controller 290 tests a connection to the smart server using one communication module included in the communication unit 210 (S620).

The controller 290 determines whether a connection test to the smart server 100 through the communication module is succeeded (S630). If a connection test to the smart server 100 through the communication module is failed, the controller 290 moves the moving unit 230 having the connection unit 220 in a first direction (S640).

As a position of the moving unit 230 is changed, a position of the connection unit 220 and the communication unit 210 mounted in the connection unit 220 is also changed.

The controller 290 determines whether a connection test to the smart server 100 through the communication module is succeeded at a changed position (S650). If a connection test to the smart server 100 through the communication module is failed even after a position is changed, the controller 290 moves the moving unit 230 in a second direction different from the first direction (S660) and the process returns to step S620.

In this case, the controller 290 performs a connection test to the smart server 100 while gradually moving in the second direction after gradually moving by a predetermined value in the first direction.

The controller 290 changes a position of the communication unit by changing a position of the moving unit and performs a connection test to the smart server 100 through a communication module, as described above (S620 to S650). Accordingly, a problem difficult to connect due to a peripheral obstacle can be solved, and when performing communication with the smart server through such a test, a more stable communication position can be found.

If a connection test to the smart server 100 through the communication module is succeeded at step S650, the controller 290 receives rate information from the smart server 100 (S670). Accordingly, the controller 290 changes operation setting according to the rate information, and the controller 290 reflects the changed rate information according to a power consumption amount and operates the home appliance (S680).

Therefore, the home appliance can be stably connected to the smart server and change operation of the home appliance according to rate information received from the smart server.

In a home appliance and a method of operating the same according to the present invention having the above-described configuration, a communication unit can be easily detached and a communication module appropriate for a peripheral communication environment can be selectively used according to the peripheral network environment and thus even if information about a communication method using in the peripheral communication environment or a smart server does not exist, the home appliance can receive data from the smart server by connecting to the smart server. Further, the home appliance according to the present invention can easily connect to a smart server regardless of a position of the home appliance by changing a position of a communication unit and thus can easily acquire information of a smart grid system and transmit information about operation of the home appliance.

The embodiment of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A home appliance, comprising:
   a connection port;
   a communication device detachably connectable to the connection port, the communication device including a plurality of communication modules;
   a controller that detects connection of the communication device in the connection port that transmits data to and receives data from a server through the communication device, that controls at least one of operation setting or an operation load in response to data received from the server, and that transmits an operation state to the server through the communication device; and
   a moving module in which the connection port is provided, wherein the moving module is configured to move from a first position adjacent to a main body of the home appliance to a second position away from the main body of the home appliance so as to change a position of the connection port,
   wherein the controller determines which of a remaining number of communication modules have established a connection with the server and resets a default communication module in response to an abnormality in the default communication module.

2. The home appliance of claim 1, wherein the communication device comprises a connection terminal that is connected to a connection terminal of the connection port so as to connect the communication device to the communication port.

3. The home appliance of claim 2, wherein the communication device is a card type communication device operated by power supplied from the home appliance.

4. The home appliance of claim 1, wherein the connection port is provided at an upper surface portion of the home appliance.

5. The home appliance of claim 1, wherein the moving module moves upward from an upper surface of the main body of the home appliance so as to position the connection port at a higher position than the upper surface of the main body.

6. The home appliance of claim 1, wherein the moving module moves laterally outward from a left lateral side or a right lateral side of the main body, or moves outward from a front side of the main body, so as to protrude outward.

7. The home appliance of claim 1, wherein the controller changes a position of the moving module from the first position to the second position so as to position the communication device connected to the connection port in the moving module at a position at which intensity of a signal received through the communication device is highest.

8. The home appliance of claim 1, wherein the controller determines which of the plurality of communication modules have established a connection to the server, sets one of the plurality of communication modules which has established a connection to the server as the default communication module, and transmits data to and receives data from the server through the default communication module.

9. The home appliance of claim 1, further comprising an output device including at least one of a speaker, a lamp, or a display, wherein the controller controls the output device to output at least one visual or audible warning regarding a connection state of the communication device in the connection port or a communication state with the server.

10. The home appliance of claim 9, wherein the controller controls the output device to output at least one visual or audible warning when a connection state of the communication device is normal, but a signal has not been received from the server for a predetermined time period or more.

11. The home appliance of claim 1, wherein the communication device comprises at least one of wireless communication module of an WiFi communication module, a ZigBee communication module, a Wibro communication module, or a mobile phone communication module.

12. The home appliance of claim 1, wherein the communication device comprises at least one wired communication module of a power line communication module or a local area communication module.

13. A method of operating a home appliance, the method comprising:
   detecting a connection of a communication device in a connection port of the home appliance, the communication device including a plurality of communication modules detachably connectable to the connection port;
   connecting one of the plurality of communication modules of the communication device in the communication port;
   testing a connection of the communication device in the communication port to determine that at least one of the plurality of communication modules of the communication device is connected to a server;
   setting one of the plurality of communication modules connected to the server as a default communication module;
   receiving data from the server via the default communication module;
   controlling at least one of an operation setting or an operation load in response to data received from the server via the default communication module, and operating the home appliance accordingly;
   detecting an abnormality in the connection between the default communication module and the server; and
   resetting the default communication module to another of the plurality of communication modules by testing in a remainder of the plurality of communication modules of the communication device,
   wherein testing the connection of the communication device in the communication port includes moving a moving module, in which the communication port is provided, away from a main body of the home appliance.

14. The method of claim 13, wherein testing the connection of the communication device in the communication port includes outputting a connection status representing normal attachment of the communication device in the communication port or detachment of the communication device from the communication port in at least one of a visual warning or an audible warning.

15. The method of claim 13, wherein moving the moving module away from the main body of the home appliance comprises determining a position of the moving module from a plurality of positions based on intensity of a signal received from the server at each of the plurality of positions.

16. The method of claim 15, wherein moving the moving module comprises moving the moving module, the connection port provided therein and the communication device connected thereto, away from an upper side, a right side, a left side, or a front side of the main body of the home appliance so as to receive a highest intensity signal from the server.

17. The method of claim 13, further comprising:
   detecting the abnormality in the connection between the default communication module and the server, and outputting a communication failure warning.

18. The method of claim 13, wherein connecting the communication module in the communication port of the home appliance comprises connecting a card type communication device including at least one of a wired communication module or a wireless communication module in the communication port of the home appliance.

* * * * *